Sept. 6, 1932. J. VAN ACKEREN 1,876,108
COKING RETORT OVEN
Filed Dec. 15, 1927 4 Sheets-Sheet 2
*Fig. 2*
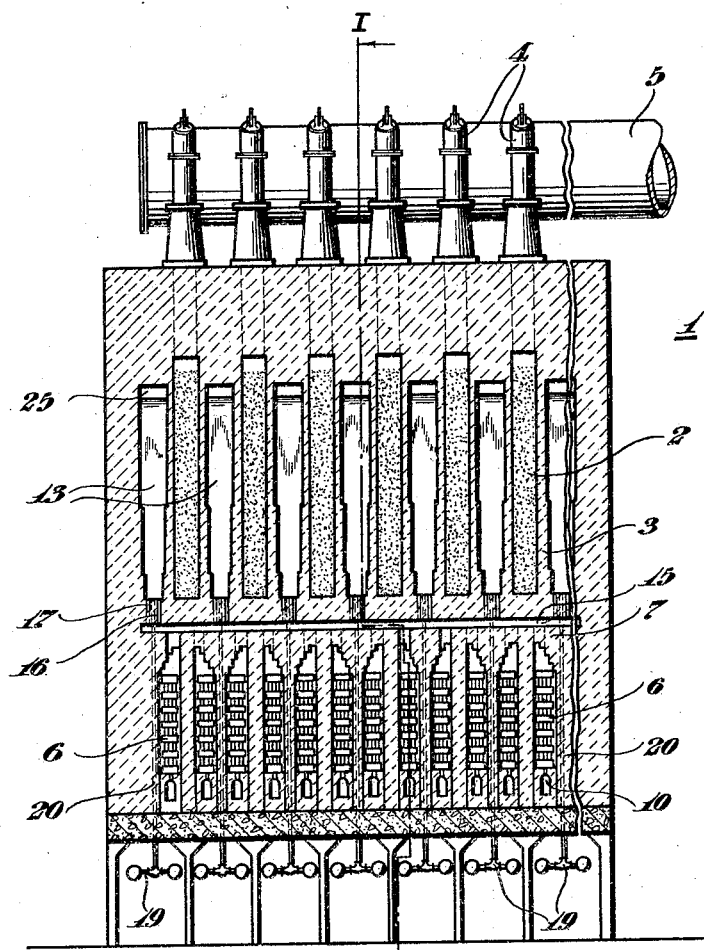
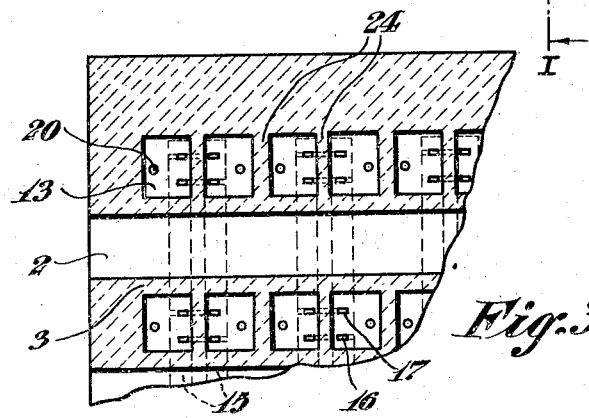
*Fig. 3*
INVENTOR.
Joseph van Ackeren.
BY Jesse R. Langley
ATTORNEY

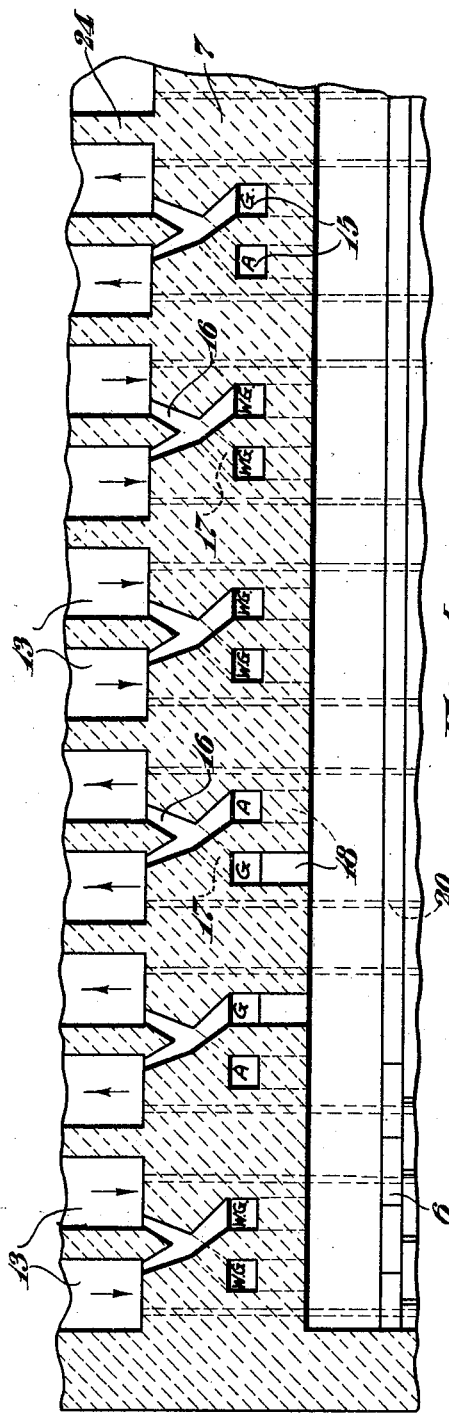

Patented Sept. 6, 1932

1,876,108

UNITED STATES PATENT OFFICE

JOSEPH VAN ACKEREN, OF O'HARA TOWNSHIP, ALLEGHENY COUNTY, PENNSYLVANIA, ASSIGNOR TO THE KOPPERS COMPANY OF DELAWARE, A CORPORATION OF DELAWARE

COKING RETORT OVEN

Application filed December 15, 1927. Serial No. 240,130.

My invention relates to coking retort oven batteries and particularly to such batteries of combination ovens having crosswise regenerators beneath the ovens and in which the heating gases traverse certain of the flame flues of each heating wall and are returned as waste gases in other flame flues.

An object of my invention is to provide a battery of coking retort ovens in which the distribution of fuel gas and air within the battery is equalized by improved means to render heating conditions more nearly uniform.

A further object is to provide a coke-oven battery wherein the distribution of waste gases is equalized in such manner as to uniformly heat the regenerators.

A further object of my invention is to provide a system of regenerators and distributing flues that are so arranged and connected that fuel gas and waste gases are never carried by adjacent regenerators or distributing flues and counterflow between waste gases and fuel gas is thereby avoided.

A still further object of my invention is to provide a coke-oven battery in which the expansion of each division or unit may be confined thereto by the employment of a suitable number of expansion joints positioned between the respective units.

In accordance with my invention, I provide a coke-oven battery having crosswise regenerators beneath the horizontal oven chambers. The heating walls between the oven chambers are each provided with vertical flame flues that are connected in groups, each group consisting of two adjacent pairs of flame flues. The flame flues of each group are connected at their tops whereby one pair of flame flues may constitute return passageways for the gases of combustion traversing the other pair of flame flues.

Horizontal brickwork separates the oven chambers and the heating walls from the crosswise regenerators. Within the horizontal brickwork and extending throughout the length of the battery are horizontal flues corresponding in number to the vertical flame flues. Each of the horizontal flues is connected to a plurality of the regenerators and also to one pair of flame flues of one group in each of the heating walls. Each of the regenerators is connected to a plurality of the horizontal flues and accordingly the flame flues of each of the several heating walls are connected in parallel relation to each other and the regenerators are also connected in parallel relation to each other. This arrangement insures that the distribution of fuel gas and air is equalized between the several flame flues of the heating walls whereby heating conditions are rendered uniform throughout the battery and that the waste gases are uniformly distributed through the regenerators whereby their temperatures are substantially equal at all times during the operation of the battery.

Reference may now be had to the accompanying drawings in connection with which the details of the construction and operation of a battery constructed in accordance with my invention will be described.

Fig. 2 is a view in longitudinal vertical section, taken along the line II—II of Fig. 1, parts being broken away;

Fig. 3 is an enlarged horizontal sectional view of a portion of the battery, taken on line III—III of Fig. 1;

Fig. 4 is an enlarged transverse vertical sectional view of a portion of the brickwork shown in Fig. 1;

Fig. 5 is an enlarged view in longitudinal vertical section of the horizontal brickwork and adjacent structure, parts being broken away.

Figure 1:
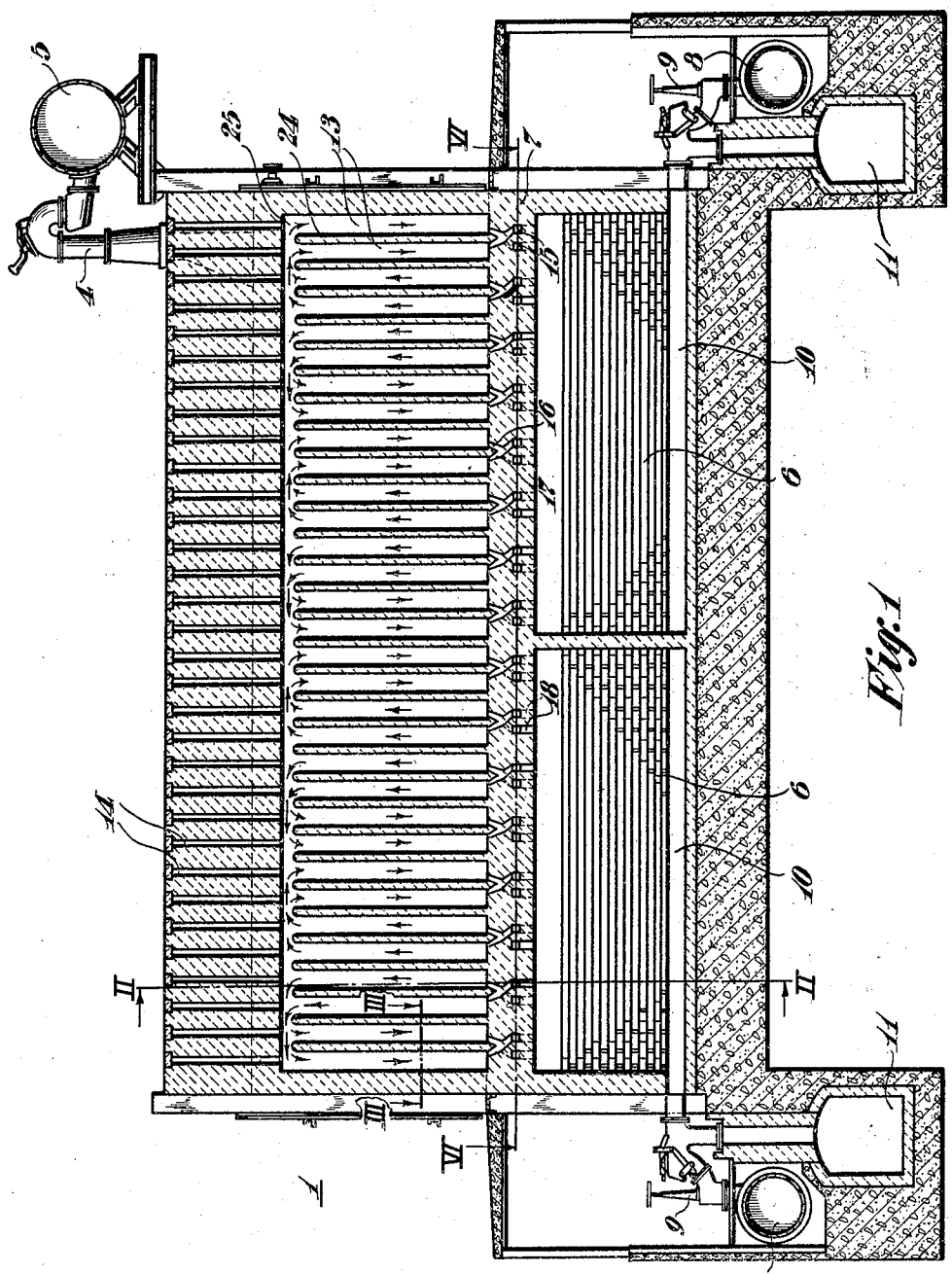
Figure 1 is a view, in transverse vertical section, taken on line I—I of Fig. 2, of a coke-oven battery embodying my invention.

Referring particularly to Figs. 1 and 2, a coke-oven battery 1 comprises a series of horizontal oven chambers 2 and heating walls 3 alternating therewith. The number of oven chambers and corresponding heating walls may be such as desired, as indicated by the parts broken away in certain of the views, only six oven chambers with their attendant 7 heating walls being shown by way of example to illustrate the principles of construction and operation. Each oven chamber is provided with an ascension pipe 4 that is connected to a collecting main 5. Beneath the oven chambers are a series of twenty-four crosswise regenerators 6 that extend half the width of the battery and are arranged in pairs transversely of the battery.

Separating the oven chambers and the heating walls from the regenerators 6 is a horizontal brickwork 7 that extends throughout the area of the battery between the walls of the latter. A fuel gas main 8 on each side of the battery is connected through valves 9 to the sole flues 10 of the several regenerators 6 on the corresponding side of the battery. Waste gas ducts 11 that are also connected to the sole flues 10 of the regenerators conduct waste gases to the stack (not shown).

Referring to Fig. 1, in which a sectional view of one of the heating walls 3 is illustrated, it will be noted that the heating wall is provided with vertical flame flues 13 that are arranged in groups of two adjacent pairs, as indicated by the arrows which show the direction of gases within the flues. The flame flues of each group communicate at the top and there is no dividing wall between the several groups. In the heating walls of the battery illustrated, there are shown, by way of example, thirty-two vertical flame flues that are divided into eight groups of four flues each. Inspection openings 14 are provided through the top of the battery for the purpose of inspecting combustion conditions within the respective flame flues 13.

Figure 6:
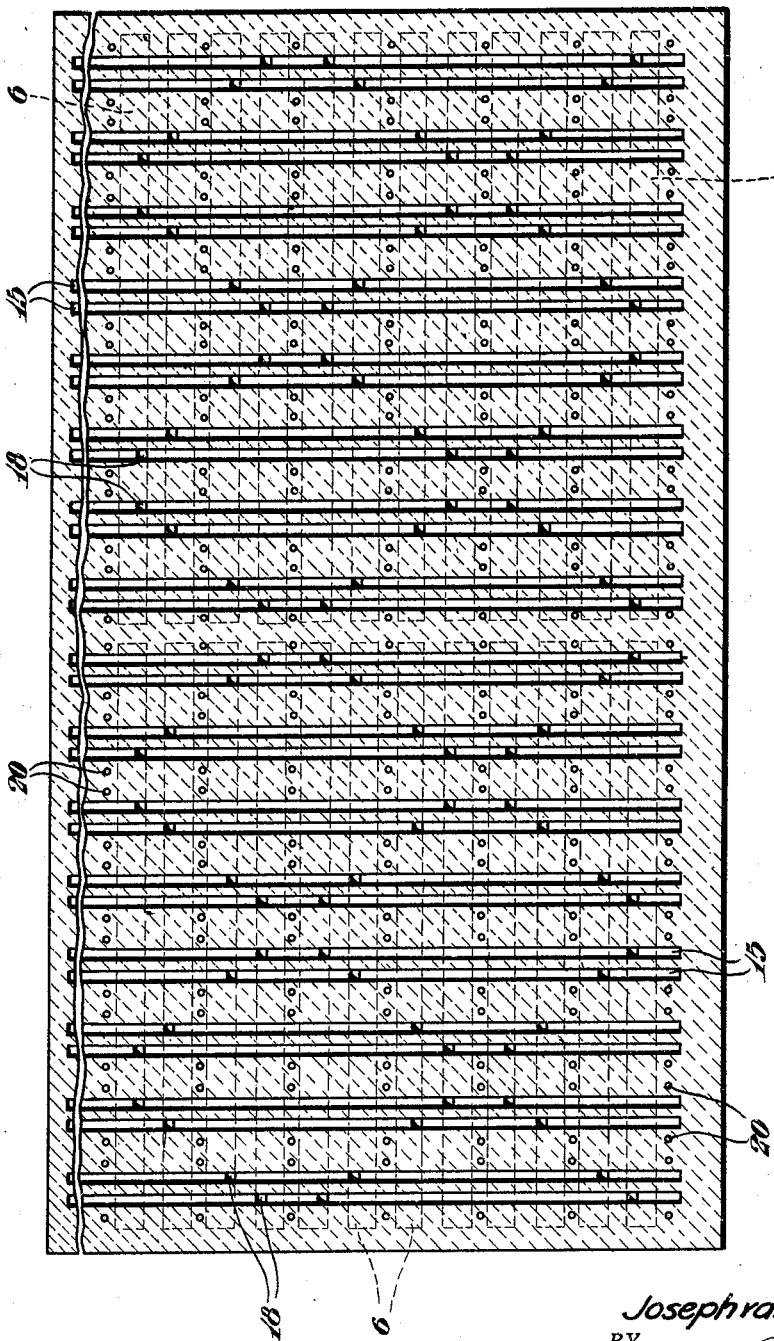
Fig. 6 is a horizontal sectional view taken on line VI—VI of Fig. 1, parts being broken away.

The vertical flame flues of each pair are connected at their lower portions to each of a pair of horizontal flues 15 that extend through the brickwork 7 throughout the length of the battery, as shown in Figs. 2, 5 and 6. The connections between the horizontal flues and the vertical flame flues comprise inclined ducts 16 and 17 that have branches extending to each of the two corresponding flame flues. Each pair of horizontal flues 15 is similarly connected to the corresponding pair of vertical flues in each heating wall. In other words, each horizontal flue is connected to both members of one pair of vertical flues in each of the heating walls.

As best shown in Fig. 6, each of the horizontal flues 15 is connected to three of the regenerators 6 and each of the regenerators 6 is connected to four of the horizontal flues by vertically-extending ducts 18. The connections between the horizontal flues 15 and the regenerators 6 are arranged symmetrically whereby the same relations will exist between the regenerators and the horizontal flues with respect to the carrying of fuel gas, air and waste gases when the battery connections are reversed, as will be more fully described hereinafter. The connections of the respective rows of regenerators are symmetrical with respect to each other. This arrangement results in a symmetrical flow of gases through the flame flues of each heating wall, as will be observed by inspection of the arrows in Fig. 1.

The flame flues 13 are adapted to be supplied with rich gas, such, for example, as coke-oven gas, by means of gas guns 19, shown in Fig. 2, that are connected by means of vertical ducts 20 to each of the vertical flues 13. The ducts 20, as will be noted, extend upwardly through the partition walls of the regenerators and through the horizontal brickwork between the horizontal flues 15 and the ducts 16 and 17. This arrangement furnishes an alternative method of heating the coke ovens in case producer gas or other lean gas is not employed.

It is important, in the construction of coke-oven batteries, to limit the expansion of any unit or division of the battery in so far as possible to that unit rather than to have such expansions cumulative throughout any considerable portion of the battery. To this end, I have provided, as best shown in Fig. 5, expansion joints 22 and 23 which extend from approximately the level of the floors of the oven chambers substantially vertically downward through the horizontal brickwork and across the horizontal flues 15 into each of the regenerators 6. The expansion joints 22 and 23 are provided on the respective sides of each oven chamber 2 and are connected to the top portion of each of the regenerators 6.

By means of this arrangement, it will be appreciated that the expansion between the several regenerator units and of the units comprising the oven chambers and heating walls will be taken up by the expansion joints between adjacent units. The expansion joints 22 and 23 are preferably filled with refractory material that is loose or flexible in character for the purpose of permitting relative movement between the sides of the expansion joints and which tends to prevent leakage of gases therethrough.

It may be assumed that the battery 1 is in operation and that the oven chambers 2 are filled with coal in various stages of coking. It may be assumed further that certain of the regenerators, as indicated by the upper row of legends in Fig. 5, are being supplied with gas and air for combustion in the flame flues connected thereto while the other regenerators are receiving waste gases from the other flame flues for storing heat therefrom before the gases are transmitted to the ducts 11. The arrangement shown in Fig. 5 is representative of both rows of regenerators.

It will be noted that the regenerators which carry fuel gas, as indicated by "G", are always separated from the regenerators carrying waste gases marked "WG" by a regenerator carrying air marked "A". By means of this arrangement, counterflow between regenerators carrying fuel gas and waste gases, respectively, is avoided. This arrangement is particularly desirable for the purpose not only of preventing waste of fuel gas by reason of leakage into the outgoing waste gases but it also avoids the danger of explosions which may occur under such conditions.

By referring to Fig. 4, it will be noted that the connections between the regenerators 6 and the horizontal flues 15 are such that the fuel gas, air and waste gases are distributed among the horizontal flues in the same order and upon the same principle as that described in connection with the regenerators 6; that is, a horizontal flue carrying air is always interposed between regenerators carrying fuel gas and waste gases, respectively, and for the reasons previously stated.

Each horizontal flue carrying air or gas, as the case may be, is connected to the three regenerators marked with corresponding legends in Fig. 5. Each horizontal flue carrying gas or air supplies both members of one pair of vertical flues in each of the several heating walls with combustible materials. These materials burn upwardly, as indicated by the arrows in Figs. 1 and 4. When the heating gases reach the tops of these vertical flues, they pass over the dividing walls 24 into the connecting horizontal flue 25 and travel downwardly in the other pair of vertical flues 13 in the same group. The heating gases, which leave the second pair of flame flues in the form of waste gases, pass downwardly through the ducts 16 and 17 into the corresponding pair of horizontal flues 15 and are distributed through the six regenerators marked "WG", each of the horizontal flues being connected to three of the regenerators.

The operating conditions described in connection with one group of flame flues 13 in each of the heating walls is typical of that of every other group of flame flues in the several heating walls. It will be noted that in the heating wall illustrated in Fig. 1 there are relatively few points of counterflow between the heating gases, the number being limited to each fourth flue.

As is customary in the operation of coke-oven batteries, the direction of gases in the several regenerators, horizontal flues and flame flues is reversed periodically at suitable intervals. Upon such reversal, the arrangement of regenerator connections is as shown in the lower line of legends in Fig. 5. The regenerators that previously carry gas and air in one direction now carry waste gases in the opposite direction, while the regenerators previously carrying waste gases now carry fuel gas or air, as the case may be. The dotted arrows indicate directions of gases after reversal.

The relation of the various regenerators with respect to the materials carried thereby is the same as in the previous period of operation in that a regenerator carrying air is always between two regenerators carrying fuel gas and waste gas, respectively. It will be obvious, also, by reason of the symmetrical connections between the regenerators and the horizontal flues 15, that a similar arrangement obtains with respect to the horizontal flues. Accordingly, counterflow between fuel gas and waste gases is entirely avoided.

The connection of each of the regenerators to a plurality of horizontal flues and the connection of each horizontal flue to a plurality of regenerators produces an equalization of the distribution of fuel gas and air to the horizontal flue supplying the same to the flame flues. The parallel connection of each horizontal flue to a pair of vertical flues in each heating wall produces a further equalization in the distribution of combustible materials, which tends to render heating conditions uniform throughout each heating wall and throughout all of the walls of the battery. The equalization is further assisted by the connection of the vertical flues at their tops by the horizontal connecting flue.

The parallel relation between the flame flues of each wall and in each group, together with the parallel connections of the horizontal flues and regenerators, produces a similar equalizing effect upon the distribution of the waste gases passing through the regenerators within which heat is being stored and the latter are, therefore, heated more uniformly than has been possible with prior constructions.

In view of the fact that each horizontal flue is connected to three regenerators and to the vertical flame flues of seven heating walls, the gases in the horizontal flues travel a relatively short distance to the several outlet ducts and the horizontal flues may, therefore, be relatively small in cross-sectional area.

It will be understood that the battery may be extended to any desired or practicable number of oven chambers in which case the number of regenerators, horizontal flues and flame flues may be varied to retain the principles of construction and operation as exemplified by the relatively small battery hereinabove described.

The foregoing and other advantages will be apparent to those skilled in the art relating to the construction and operation of coke ovens. My invention is not to be limited except as indicated in the appended claims.

I claim as my invention:—

1. In a coking retort oven battery, the combination with a series of alternate oven chambers and heating walls therefor arranged side-by-side in a row, each of said heating walls comprising a plurality of flame flues, and a plurality of regenerators below said oven chambers and extending transversely of the battery, of a plurality of horizontal flues each extending throughout the length of said battery and transversely of said oven chambers, said horizontal flues communicably connecting each of said regenerators to at least one flame flue in each of said walls.

2. In a coking retort oven battery, the combination with a series of alternate oven chambers and heating walls therefor arranged side-by-side in a row, each of said heating walls comprising a plurality of flame flues, and a plurality of regenerators below said oven chambers, of a plurality of horizontal flues each extending throughout the length of said battery and transversely of said oven chambers and of said regenerators said horizontal flues communicably connecting each of said regenerators to certain of the flame flues of each of the heating walls of the battery.

3. In a coking retort oven battery, the combination with a series of alternate oven chambers and heating walls therefor arranged side-by-side in a row, each of said heating walls comprising a plurality of flame flues communicably connected in groups for the flow of gases simultaneously in opposite directions in each group, and a plurality of regenerators below said oven chambers, of a plurality of horizontal flues extending beneath said oven chambers and transversely with respect thereto for communicably connecting each of said regenerators to similarly disposed flame flues of the groups of certain of said walls.

4. In a coking retort oven battery, the combination with a series of alternate oven chambers and heating walls therefor, arranged side-by-side in a row each of said heating walls comprising a plurality of flame flues communicably connected in groups of two adjacent pairs for conveying gases simultaneously in opposite directions, and a plurality of horizontal flues extending transversely to said oven chambers, each of said horizontal flues being communicably connected to one pair of flues in each of said walls, of a plurality of regenerators communicably connected to each of said horizontal flues at spaced points thereof.

5. In a coking retort oven battery, the combination with a series of alternate oven chambers and heating walls therefor arranged side-by-side in a row, each of said heating walls having a plurality of groups of vertical flame flues, the flues of each of the groups being communicably connected at their tops whereby gases may travel simultaneously in opposite directions in each group, of means for supplying fuel and air to certain flues of each group and for withdrawing gases of combustion from the other flues of each group, said means comprising horizontal flues beneath said oven chambers and extending lengthwise of said battery.

6. In a coking retort oven battery, the combination with a series of alternate oven chambers and heating walls therefor arranged side-by-side in a row, each of said heating walls comprising a plurality of groups of vertical flame flues, the flues of each of the groups being communicably connected at their tops whereby gases may travel simultaneously in opposite directions in each group, of means for supplying fuel and air to certain flues of each group and for withdrawing gases of combustion from the other flues of each group, said means comprising horizontal flues beneath said oven chambers, each of said horizontal flues extending throughout the length of the battery and communicably connected to similarly disposed flame flues in each of said heating walls.

7. In a coking retort oven battery, the combination with a series of alternate oven chambers and heating walls therefor, each of said heating walls comprising a plurality of groups of vertical flame flues, each group consisting of two pairs of flame flues that are communicably connected at their tops for movement of gases simultaneously in opposite directions in the respective pairs, of a horizontal flue communicably connected to both members of each pair of flame flues in one group of each heating wall, and a regenerator communicably connected to each horizontal flue.

8. In a coking retort oven battery, the combination with a series of alternate oven chambers and heating walls therefor arranged side-by-side in a row, each of said heating walls comprising a plurality of flame flues, of two pairs of regenerators corresponding to each of said oven chambers, and horizontal flues extending lengthwise of the battery and each communicably connected to a plurality of flame flues of each heating wall of the battery and to a plurality of said regenerators.

9. In a coking retort oven battery, the combination with a series of alternate oven chambers and heating walls therefor arranged side-by-side in a row, each of said heating walls having a plurality of vertical flame flues, of a plurality of regenerators, and horizontal flues equal in number to said vertical flame flues, each of said horizontal flues being communicably connected to two of said flame flues in each wall and to certain of said regenerators.

10. In a coking retort oven battery, the combination with a series of alternate oven chambers and heating walls therefor, each of said heating walls having a plurality of vertical flame flues, certain of which intercommunicate at their upper ends, of means for supplying gas and air to the lower portion of some of the communicating flues and for withdrawing waste gases from the lower portion of the other communicating flues, said means comprising a plurality of horizontal flues communicably connected respectively to certain of said flame flues of each of said heating walls and regenerators communicably connected to said horizontal flues.

11. In a coking retort oven battery, the combination with a series of alternate oven chambers and heating walls therefor, each of said heating walls having a plurality of vertical flame flues, certain of which intercommunicate at their upper ends, of means for separately supplying gas and air to the lower portion of some of the communicating flues and for withdrawing waste gases from the lower portion of the other communicating flues, said means comprising a plurality of horizontal flues communicably connected respectively to certain of said flame flues of each of said heating walls and regenerators communicably connected to said horizontal flues, said regenerators being so connected as to be adapted to supply air to a regenerator between those for fuel gas and waste gases to avoid counterflow pressure differential between the fuel gas and waste gas in adjacent regenerators.

12. In a coking retort oven battery, the combination with a series of alternate oven chambers and heating walls therefor, each of said heating walls having a plurality of vertical flame flues, certain of which intercommunicate at their upper ends, of means for separately supplying gas and air to the lower portion of some of the communicating flues and for withdrawing waste gases from the lower portion of the other communicating flues, said means comprising a plurality of horizontal flues communicably connected respectively to certain of said flame flues of each of said heating walls and regenerators communicably connected to said horizontal flues, said horizontal flues being so connected as to be adapted to supply air to a horizontal flue between those for carrying waste gases and fuel gas to avoid counterflow pressure differential between the waste gases and fuel gas in adjacent horizontal flues.

13. In a coking retort oven battery, the combination with a series of alternate oven chambers and heating walls therefor, each of said heating walls having a plurality of vertical flame flues, certain of which intercommunicate at their upper ends, of means for separately supplying gas and air to the lower portion of some of the communicating flues and for withdrawing waste gases from the lower portion of the other communicating flues, said means comprising a plurality of horizontal flues communicably connected respectively to certain of said flame flues of each of said heating walls and regenerators communicably connected to said horizontal flues, said regenerators and said horizontal flues being so connected and arranged that a regenerator or a horizontal flue for carrying air is always between similar passageways for carrying fuel gas and waste gases, respectively.

14. In a coking retort oven battery, the combination with a series of alternate horizontal oven chambers and heating walls therefor arranged side-by-side in a row, each of said heating walls having a series of vertical flame flues communicably connected in groups compirsing flues for initial combustion and return flues for waste gases, of horizontal flues each extending throughout the length of the battery, each of said horizontal flues communicating with the combustion flues or the return flues, as the case may be, of one group in each heating wall of the battery, and a plurality of regenerators extending transversely of the battery and each of which is communicably connected to a plurality of said horizontal flues.

15. In a coking retort oven battery, the combination with a series of alternate horizontal oven chambers and heating walls therefor arranged side-by-side in a row, each of said heating walls having a series of vertical flame flues communicably connected in groups, of means for supplying air and fuel to certain flues in each group, for withdrawing waste gases from the other flues in each group and for equalizing heating conditions in said battery, said means comprising ducts for communicably connecting similarly disposed flues in the several walls in parallel relation.

16. In a coking retort oven battery, the combination with a series of alternate horizontal oven chambers and heating walls therefor arranged side-by-side in a row, each of said heating walls having a series of vertical flame flues communicably connected in groups, of means for supplying air and fuel to certain flues in each group, for withdrawing waste gases from the other flues in each group and for equalizing heating conditions in said battery, said means comprising ducts for communicably connecting similarly disposed flues in each wall in parallel relation to each other and regenerators in parallel relation to each other and communicating with said ducts.

17. In a coking retort oven battery, the combination with a series of alternate oven chambers and flued heating walls therefor, of a plurality of regenerators beneath said oven chambers, horizontal brickwork separating said oven chambers from said regenerators, horizontal flues in said brickwork that are communicably connected to said regenerators and to the flues of said heating walls, and expansion joints in said brickwork extending across said horizontal flues and into said regenerators.

18. In a coking retort oven battery, the combination with a series of alternate oven chambers and flued heating walls therefor arranged side-by-side in a row, and a plurality of regenerators beneath said oven chambers, said oven chambers and said regenerators extending transversely of said battery, of horizontal brickwork separating said oven chambers from said regenerators, horizontal flues in said brickwork extending transversely of said oven chambers for operatively connecting said regenerators and the flues of said heating walls, and expansion joints in said brickwork extending downwardly from approximately the level of the floors of the oven chambers across said horizontal flues and into the several regenerators.

19. In a battery of horizontal coking retort ovens, the combination with a series of alternate oven chambers and heating walls therefor arranged side-by-side in a row, said heating walls having flame flues, regenerators beneath said oven chambers and horizontal brickwork between said oven chambers and said regenerators, of horizontal flues in said brickwork extending transversely of said oven chambers for connecting said regenerators and said flame flues, means for supplying relatively lean gas to certain of said regenerators for distribution to said flame flues and means for supplying relatively rich gas to said flame flues independently of said regenerators and said horizontal flues.

In testimony whereof, I have hereunto subscribed my name this 14th day of December, 1927.

JOSEPH VAN ACKEREN.